Oct. 17, 1933.  V. J. BURNELLI  1,930,922
AMPHIBIAN AIRCRAFT
Filed Nov. 20, 1930  2 Sheets-Sheet 1
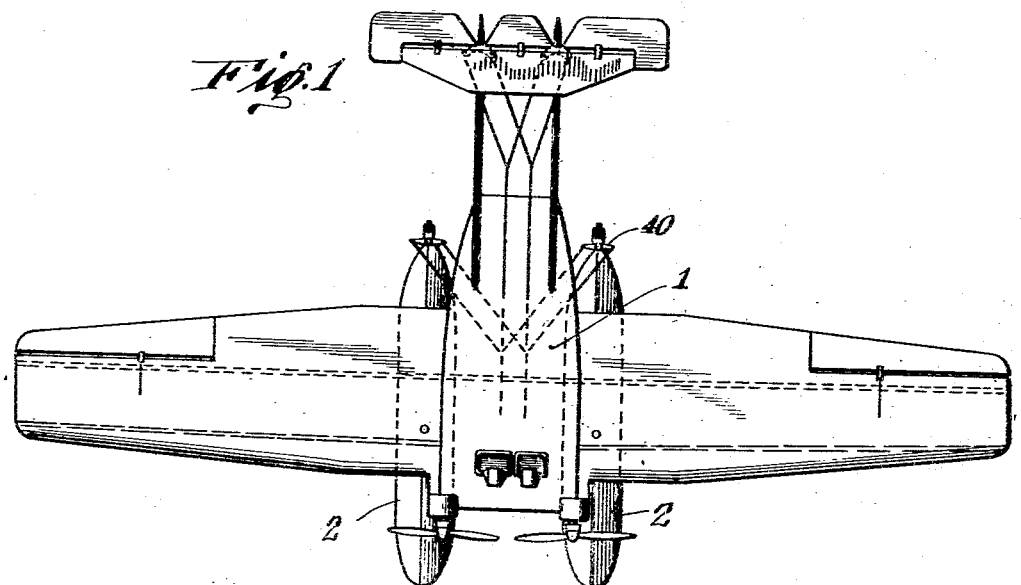
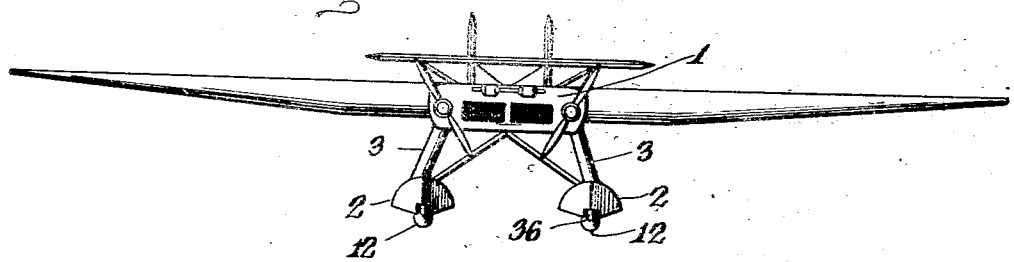
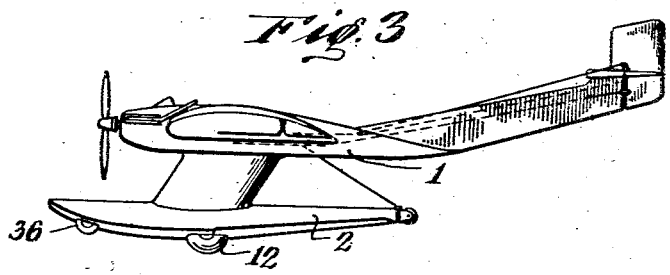
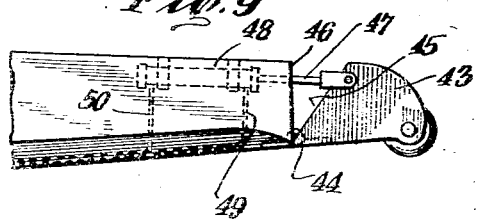
Inventor
Vincent J. Burnelli
By his Attorney
Frederick S. Barker Oct. 17, 1933.  V. J. BURNELLI  1,930,922
AMPHIBIAN AIRCRAFT
Filed Nov. 20, 1930  2 Sheets-Sheet 2
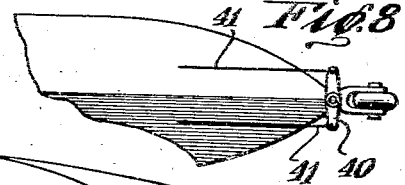
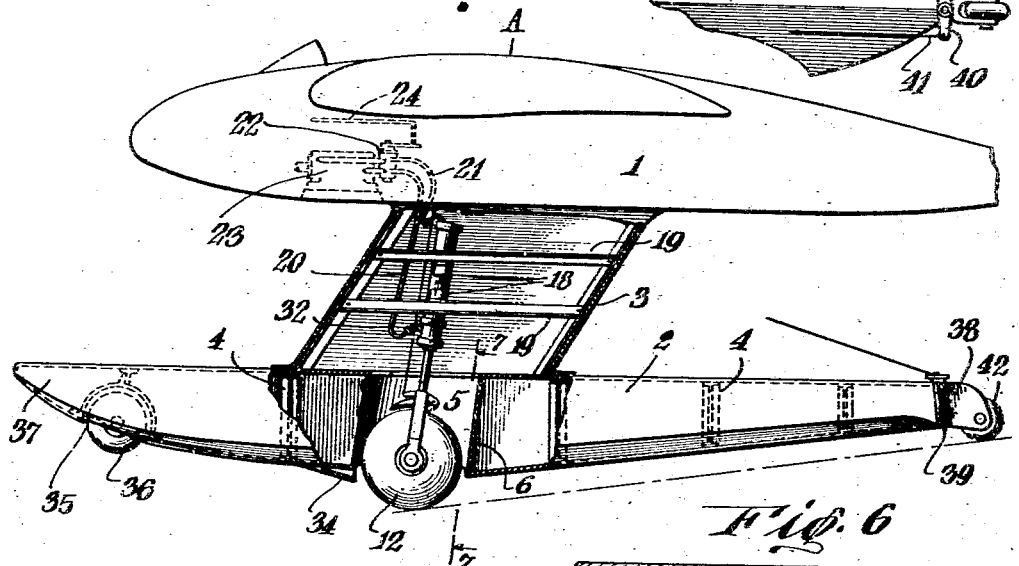
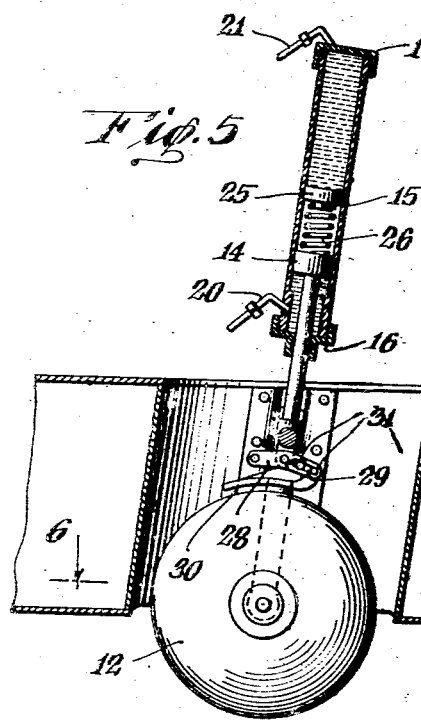
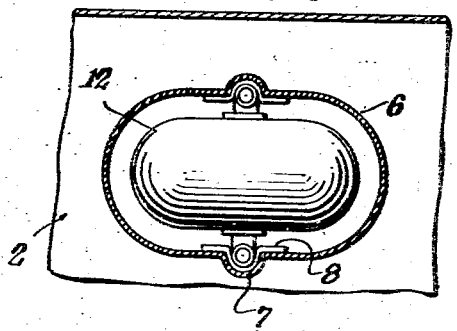
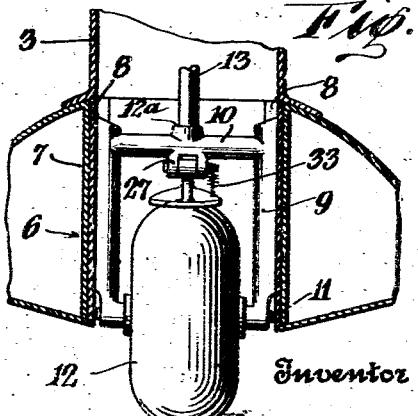
Inventor
Vincent J. Burnelli
By his Attorney
Frederic A. Baker Patented Oct. 17, 1933

1,930,922

UNITED STATES PATENT OFFICE 1,930,922

AMPHIBIAN AIRCRAFT

Vincent J. Burnelli, New York, N. Y., assignor, by mesne assignments, to Burnelli Aircraft, Ltd., Dover, Del., a corporation of Delaware Application November 20, 1930
Serial No. 496,846

5 Claims. (Cl. 244—2)

This invention relates to amphibian aircraft having pontoons, and wheels that are extensible and retractible with relation thereto, whereby the aircraft is rendered operable both upon land and water.

One of the objects of my invention is to provide a downwardly open chamber in a pontoon adapted for the reception of a traction wheel, and oppositely disposed guide-ways in said chamber for a wheel carrier.

Another object of my invention is to provide a bifurcated wheel carrier whose members straddle the wheel and provide the journals for the wheel axle, said members being slidable in the guide-ways and united by a cross-piece.

A further object of my invention is to provide hydraulic means for raising and lowering the wheel carrier.

A still further object of my invention is to provide wheel braking means mounted upon the wheel carrier.

My invention further comprehends an aircraft having a pair of pontoons, each provided with retractible wheels located in a transverse vertical plane that lies approximately in the centre of gravity of the aircraft, or slightly in advance thereof, together with other wheels, journalled in the pontoons, in elevated positions at forward portions thereof, said forward wheels being adapted to have surface contact, in traction of the retractible wheels, when the supporting airfoil of the aircraft is at a negative angle, and to be elevated above the surface when the pontoons are planing on water.

Still another feature of my invention consists in the provision of rear portions of the pontoons, hinged to swing vertically, carrying wheels to serve as skids and rear supports, and the provision of hydraulic means for raising and lowering said rear portions together with the raising and lowering of the traction wheels.

Also my invention includes the feature of the pontoon rear portions each carrying a rudder for directional control of the aircraft in water.

Other features and advantages of my invention will hereinafter appear.

In the drawings:

Figure 1 is a top plan view of an amphibian aircraft embodying my improvements.

Fig. 2 is a front elevation thereof.

Fig. 3 is a side elevation, on a smaller scale, of Figs. 1 and 2.

Fig. 4 is a side elevation, partly in section, of my improved amphibian aircraft.

Fig. 5 is an enlarged, partial side section through a pontoon, with a wheel and the hydraulic raising and lowering means therefor.

Fig. 6 is a section on the line 6—6 of Fig. 5.

Fig. 7 is a section on the line 7—7 of Fig. 4.

Fig. 8 is a partial plan view showing the rear part of the pontoon with the tail wheel-skid in the form of a rudder, and Fig. 9 is a partial side view, showing the rear part of a pontoon having a hinged portion carrying a wheel-skid, and having hydraulic means for raising and lowering said hinge portion.

In said views let 1 indicate a fuselage, here shown as the Burnelli, airfoil contoured type, and let 2, 2 indicate pontoons, which are respectively connected to the fuselage by struts 3, 3.

The pontoons are similar in construction, each having the bulkheads 4 and a central well or chamber 5 produced by an elliptical wall 6 that is open at the bottom.

The wall 6 has oppositely disposed grooves or channels 7 formed therein, as by providing concavo-convex portions in the sides of said wall, and lining strips 8 are fitted within said channels, adapted to serve as guide-ways for a wheel-carrying frame. Said frame comprises a pair of spaced vertical members 9, connected near their upper ends by a transverse member 10, and, at their lower ends being connected by an axle 11, upon which a wheel 12 is journalled. The members 9 of the frame fit slidably in the guide-ways 8, thereby enabling the frame with its wheel to be raised and lowered, so that said wheel can be projected below the pontoon, for traction purposes, or retracted within the well when the aircraft is to be used on water.

The transverse member 10 of the frame is provided with an upward boss 12a, from which there extends a rod 13, having a piston 14 that is reciprocable in a cylinder 15. Said cylinder, which is closed at both ends, as by caps 16, 17, is located within a strut 3, and may be secured in a fixed position in any desirable manner. As shown, it is connected by cleats or straps 18 to brace members 19 that are secured to the strut.

The cylinder 15 is included in an oleo pressure or hydraulic system, fluid leads 20, 21 communicating with the cylinder respectively near its lower and upper ends for the operation of the piston, to thereby raise and lower the wheel. The fluid leads 20, 21 connect with a valve 22 which controls the flow through the leads from a pump 23, the valve being actuable as by a lever 24 that is manipulable by the pilot.

Since the fluid column in cylinder 15 is incompressible, I provide an auxiliary piston 25 within the cylinder, in spaced relation above piston 14, and place a spring 26 between the pistons to thereby provide a cushion that becomes effective when the wheel makes contact with the surface in landing, and also aids in absorbing shocks that occur in taxiing over a rough surface.

The transverse member 10 of the wheel-carrying frame may also serve to carry the brake which is disposed in spaced relation above the wheel. For this purpose lugs 27 depend from member 10, said lugs having pivoted therein a rocker arm 28 that at one end has a slot 29. A brake shoe 30 has two studs 31 that are entered in said slot, and said rocker arm has its other end engaged by a flexible connector 32 which is extended to the cockpit for operation by the pilot. When the connector is drawn upwardly thereby the rocker arm presses the shoe against the wheel.

A spring, as indicated at 33, may be employed to hold the brake shoe normally retracted.

An inclined piece 34 may be placed just in advance of the well 5, at the base of the pontoon, to serve as a deflector and prevent water from entering the well when planing on the surface.

Journalled in each pontoon, within a pocket 35 provided therefor, is a wheel 36, said pocket being located forwardly of the well 5, and near the pontoon nose 37, where the pontoon bottom takes an upward curve. A segment only of the wheel 36 is exposed below the pontoon bottom, and due to its elevation said wheel is clear above the water surface while the aircraft is planing on water.

The function of wheels 36, as in my co-pending application, Serial No. 265,022, filed March 27, 1928, of which this application is a continuation in part, is to comprise traction means aligned longitudinally with the main traction wheels 12, but lying in a horizontal plane that is above the plane of wheels 12 when the aircraft is in the attitude of normal flight. In consequence, and because the forward wheels obviate the liability of nosing over in making a landing, the supporting airfoils of the aircraft will be at a negative angle when surface contact is made by both pairs of wheels 12 and 36, whereby air pressure increases the tractive effect of the wheels, and thereby the landing run is shortened. In addition the brakes may be applied unrestrictedly in view of the safety factor of the forward wheels.

Whilst I have stated that the wheels 12 should be disposed about in the centre of gravity of the aircraft, yet if their position be slightly in advance of the centre of gravity as is indicated in Fig. 4, then obviously the aircraft will stand at rest on the surface upon its wheels 12 and 36.

Another feature of my present invention consists in providing a vertical rudder 38 at the stern of each pontoon, said rudders being hinged as at 39 and having a tiller 40 with control connectors 41 that extend to the cockpit. Each rudder also has a wheel 42 journalled therein to serve as a rear skid.

In Fig. 9 there appears a modified form of tail skid for the pontoons, wherein a rear, wheel-carrying portion 43 of a pontoon is hinged as at 44 to the base of the main pontoon portion, and is adapted to be raised vertically when the aircraft is to be used on water. For this purpose the portion 43 has an inclined surface 45 opposed to the rear surface 46 of the main portion, and said portion 43 has a rod 47 pivoted thereto and extended into a cylinder 48 where it has a piston (not seen), said cylinder being included by leads 49, 50, in the hydraulic system used for the operation of wheels 12, so that by these means the portion 43 may be raised together with the retraction of wheels 12, and lowered therewith.

It has been stated that a negative incidence of the supporting airfoils when the main and forward wheels are in contact with the surface, assists the tractive pressure and thereby shortens the landing run of the aircraft.

This effect in degree can also be achieved when the supporting airfoils under the same landing condition are at zero or even a positive angle of incidence, provided the fuselage is then at a negative angle, and in the instance of the Burnelli type, airfoil fuselage, which itself has a substantial lift over drag character, the surface gripping effect produced is quite substantial.

For example, assuming the supporting airfoils A of the aircraft herein illustrated to have a zero or positive angle of incidence when the wheels 12 and 36 are in contact with the surface, and the airfoil fuselage 1 to at that time have a negative angle of incidence, obviously the lift component of the airfoils A will be at least partially compensated by the downward pressure exerted upon the airfoil fuselage, all in the interest of promoting a better surface grip by the wheels 12 and 36.

Variations within the spirit and scope of my invention are equally comprehended by the foregoing disclosure.

I claim:

1. The combination with an amphibian aircraft having pontoons with retractible wheels, of rear pontoon portions, hinged to swing vertically, skid wheels journalled in said pontoon portions, hydraulic means for retracting said retractible wheels, other hydraulic means for swinging said rear pontoon portions, and control means for the simultaneous operation of both hydraulic means.

2. The combination with an aircraft having a fuselage and pontoons of hollow struts that are positioned intermediate said fuselage and pontoons and constitute connecting means therebetween, said pontoons having wells therein located about in a vertical plane passing through the centre of gravity of the aircraft, guide-ways in each well, wheel carrying frames slidable in said guide-ways, a wheel journalled in each frame, and means that extend into and are secured to said struts, for reciprocating said frames to retract and project the wheels with respect to the pontoons.

3. The combination with an amphibian aircraft having pontoons with retractible wheels, of rear pontoon portions, hinged to swing vertically, skid wheels journalled in said pontoon portions, power means for retracting said retractible wheels, other power means for swinging said rear pontoon portions, and control means for the simultaneous operation of both power means.

4. The combination with an amphibian aircraft having an airfoil fuselage and other supporting airfoils, also having pontoons, of struts connecting said pontoons and fuselage, and bracing means between said pontoons and fuselage, main retractible traction wheels journalled within said pontoons about in a vertical plane passing through the centre of gravity of the aircraft, and other wheels journalled in the pontoons forwardly of the main wheels and positioned above the water line of the pontoons when planing, said airfoil fuselage having a negative angle of incidence when the wheels all have surface contact.

5. The combination with an amphibian aircraft having an airfoil fuselage and other supporting airfoils, also having pontoons, of main retractible traction wheels journalled within said pontoons about in a vertical plane passing through the centre of gravity of the aircraft, and other wheels journalled in the pontoons forwardly of the main wheels and positioned above the water line of the pontoons when planing, said airfoil fuselage having a negative angle of incidence when the wheels all have surface contact.

VINCENT J. BURNELLI.